United States Patent [19]

Nagano et al.

[11] Patent Number: 4,642,686
[45] Date of Patent: Feb. 10, 1987

[54] SYSTEM FOR MEASURING AMOUNT OF RUBBER BANK BETWEEN ROLLS

[75] Inventors: Jun Nagano; Shuichi Tanaka, both of Tokyo, Japan

[73] Assignee: Bridgestone Corporation, Tokyo, Japan

[21] Appl. No.: 721,740

[22] Filed: Apr. 10, 1985

[30] Foreign Application Priority Data

Apr. 13, 1984 [JP] Japan .................................. 59-74209

[51] Int. Cl.$^4$ .............................................. H04N 7/18
[52] U.S. Cl. .................................... 358/107; 358/101; 425/145; 264/40.1
[58] Field of Search ................ 358/107, 101; 364/673; 425/200, 201, 135, 145, 147, 150; 264/40.1, 40.2, 40.4, 40.7; 75/41

[56] References Cited

U.S. PATENT DOCUMENTS

| 3,844,870 | 10/1974 | Donoghue | 364/473 |
| 3,898,024 | 8/1975 | Wockener | 425/145 |
| 3,930,922 | 1/1976 | Donoghue | 364/473 |
| 4,315,771 | 2/1982 | Bobillon | 358/107 |

Primary Examiner—James J. Groody
Assistant Examiner—John K. Peng
Attorney, Agent, or Firm—Sughrue, Mion, Zinn, Macpeak & Seas

[57] ABSTRACT

A system for measuring an amount of a rubber bank between rolls having a camera arranged in front of rubber banked between a pair of rolls for obtaining an image of the banked rubber. A screen acts as a background for the banked rubber when said screen is photographed by said camera along a straight line connecting the camera with the banked rubber. A light source irradiating light onto the screen illuminates by back lighting. A processor calculates the amount of the banked rubber from an image produced by the camera.

11 Claims, 6 Drawing Figures

SYSTEM FOR MEASURING AMOUNT OF RUBBER BANK BETWEEN ROLLS

BACKGROUND OF THE INVENTION

The present invention relates to a device for measuring an amount of rubber contained between a pair of rolls arranged, for example in a heat treatment roll, a calender roll, etc.

It is sometimes desired to measure an amount of rubber banked, that is constrained between a pair of rolls in certain applications such as a heat treatment roll, a calender roll, or the like. This is because, for example, in a heat treatment roll, when the rubber which is now being heat treated is exchanged with another type of rubber, it is necessary to determine the feeding timing of the second type of rubber on the basis of the amount of the retained or banked rubber in order to reduce rubber remixing. In the case of a calender roll, in manufacturing a sheet-like material, it is necessary to cause an extruder for feeding resin to the calender roll to be subject to feedback control on the basis of the amount of the banked resin.

A device for measuring a banked amount of rubber for calender roll operation is disclosed in Japanese Patent Application Laid-Open No. 132072/1977. In this device, contrast is provided by irradiating light to resin banked between a pair of rolls from the slantingly upper forward direction of the resin by a lighting device. The irradiated resin is photographed by a camera disposed in front of the resin.

In treating rubber by using such a measuring device, however, the irradiated light is reflected from both the surfaces of the banked rubber and the rear roll, so that there is a problem in that it is difficult to clearly distinguish the boundary between the rubber and the rear roll. On the other hand, it can be theoretically considered to arrange a light device, banked resin and a camera substantially on a straight line, to make the light irradiate on the banked resin as well as directly imfringe on the camera. In such an arrangement, however, "blooming" may occur in the camera image due to the directly incident light. The boundary of the resin is vague to discern given this optical problem.

SUMMARY OF INVENTION

The present invention has been attained in view of such problems and an object thereof is to provide a device for accurately measuring an amount of rubber banked between rolls by clearly establishing the boundary of the banked rubber to be photographed by a camera.

This and other objects are achieved by a system for measuring an amount of a rubber bank between rolls which comprises a camera arranged in front of the rubber banked between a pair of said rolls for photographing the banked rubber; a screen for acting as a background of the banked rubber when the screen is photographed by the camera along a straight line connecting the camera with the banked rubber behind said banked rubber and, at the same time for brightening the surface of a rear one of said rolls, a light source irradiating light onto the screen; and a processing means for calculating the amount of said banked rubber from a picture photographed by the camera.

DESCRIPTION OF THE PREFERRED EMBODIMENT

Figure 1:
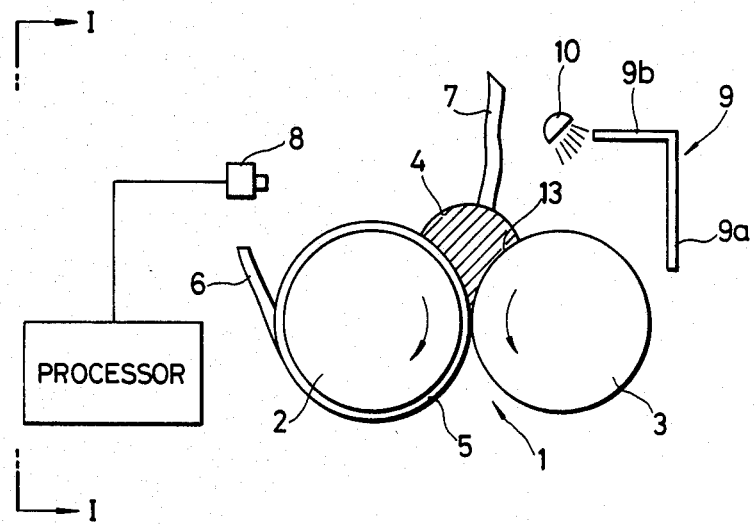
FIG. 1 is a side view showing a preferred embodiment according to the present invention.

Referring to the drawings, an embodiment according to the present invention will now be described.

Figure 2:
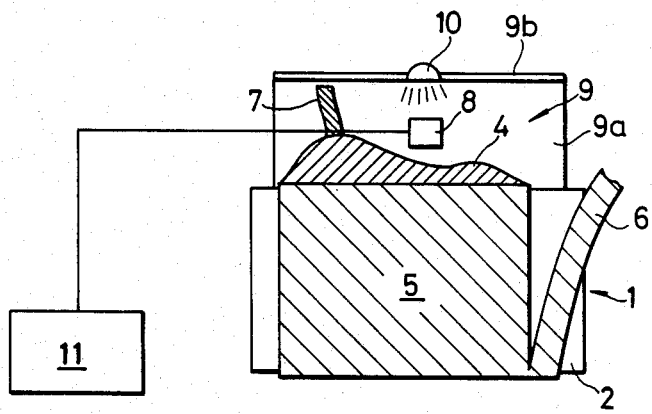
FIG. 2 is a view from the direction of arrows I—I in FIG. 1.

In FIGS. 1 and 2, the reference numeral 1 designates a heat treatment roll which is provided with a pair of front and rear rolls 2 and 3. The front and rear rolls 2 and 3 are horizontally disposed in positions close to each other and rubber 4 accumulates in a bank between the front and rear rolls 2 and 3. When the front and rear rolls 2 and 3 are rotated in synchronism with each other in the direction as shown by arrows in FIG. 1 by a driving mechanism (not illustrated), the bank rubber 4 is stretched by the front and rear rolls 2 and 3 to generate heat to be thereby softened. At that time, the banked rubber is wound on the surface of either one of the rolls, for example in this embodiment, the front roll 2 to form belt-like wound rubber 5. Reference numeral 6 designates belt-like fed-out rubber which is a part of the wound rubber 5 cut out by a knife (not illustrated) and pulled out therefrom. Reference numeral 7 designates fed-in rubber which is supplied to the banked rubber 4 in the same quantity as the fed-out rubber 6.

In front of the banked rubber 4, a video camera 8 such as a video through which a two-dimensional picture can be obtained is disposed to take a photograph of the banked rubber 4. Behind the banked rubber 4, there is provided a screen 9 made of, for example, a white acryl board and disposed along a straight line connecting the video camera 8 with the banked rubber 4. The screen 9 is composed of a vertical portion 9a and a horizontal portion 9b. The horizontal portion 9b is primarily used to irradiate by reflecting the surface of the rear roll 3. That is, the video camera 8, the banked rubber 4 and the screen 9 are aligned along a straight line with the banked rubber 4 disposed betwen the video camera 8 and the screen 9. The straight line is substantially parallel with a plane containing both the rotary shafts of the front and the rear rolls 2 and 3, so that when the banked rubber 4 is photographed by the video camera 8, the screen 9 and a surface portion 13 of the rear roll 3 above the front roll 2 provide a background.

Reference numeral 10 designates a light source disposed between the banked rubber 4 and the screen 9. The light source 10 irradiates light on the front surface of the screen 9. The horizontal portion 9b of the screen 9 irradiates the portion 13 of the rear roll 3 by reflection. The light irradiating the banked rubber 4 from the light source 10 is minimized by positioning the source 10 behind the banked rubber 4. Reference numeral 11 designates a processor 11 which is connected to the video camera 8 to receive data on the size of the rubber bank from the picture photographed by the video camera 8.

Figure 3:
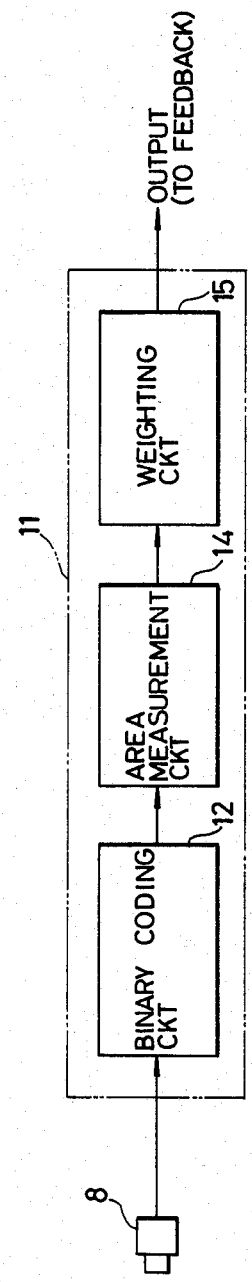
FIG. 3 is a block diagram of a processor in accordance with this invention.
Figure 4:
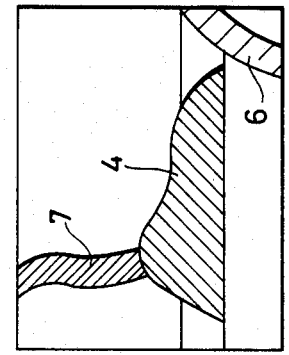
FIG. 4 is an explanatory view showing a picture photographed by a video camera.

As shown in FIG. 3, the illustrated 11 comprises a binary coding circuit 12 which scans a picture image photographed by the video camera 8. Such is shown in FIG. 4. The coding circuit 12 converts, for example, a bright region into a high-level signal while a dark region into a low-level signal. At that time, portions of the fed-in rubber 7 and the wound rubber 5 existing in the picture are electrically masked.

Figure 5:
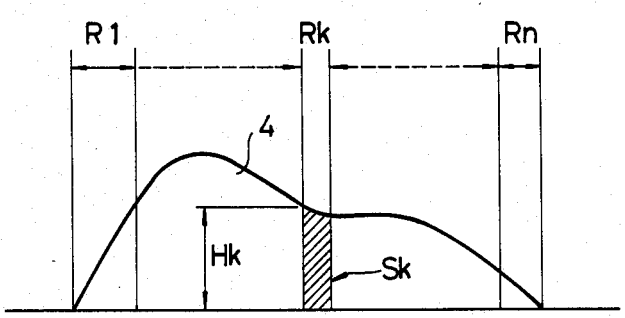
FIG. 5 is an explanatory diagram for explaining an algorithm in the case of measuring the amount of the rubber bank.
Figure 6:
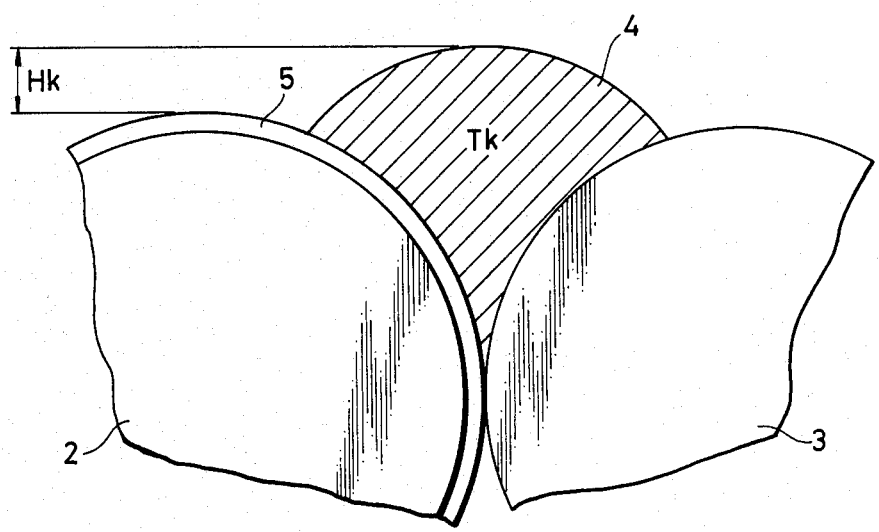
FIG. 6 is an explanatory diagram for explaining an algorithm similar to FIG. 5.

Reference numeral 14 designates an area measuring circuit for measuring an apparent area of the banked rubber 4 when viewed from the video camera 8, on the basis of signals transmitted from the binary coding circuit 12. The area measuring circuit 14 operates in the following manner. First, as shown in FIG. 5, the picture of the banked rubber 4 is divided into n divisions in the axial direction of the front and rear rolls 2 and 3. The number of divisions and the width of each division may be selected by known resolution accuracy techniques. Considering the k-th division, the number of black picture elements in that portion of the video image corresponding to the banked rubber 4 are counted to measure the area which is in turn divided by the width Rk of the k-th division to thereby obtain the average bank height Hk of this k-th division (see FIG. 5).

Referring again to FIG. 3, reference numeral 15 designates a weight calculating circuit for calculating the weight of the banked rubber 4 on the basis of the measurement result by the area measuring circuit 14. The weight calculating circuit 15 operates in the following manner. The volume of the k-th division can be obtained by multiplying the above-mentioned width Rk by the sectional area Tk of the k-th division. The sectional area Tk can be experimentally expressed as a function of the height Hk of the division.

$$Tk=f(Hk)$$

Further, since Hk=Sk/Rk is satisfied, $$Tk=f(Sk/Rk).$$

Therefore, the total weight W of th banked rubber can be expressed by:

$$W=\rho\Sigma Rk\times f(Sk/Rk),$$

where $\rho$ represents a specific gravity of the banked rubber 4. The above-mentioned function f is obtained on the basis of the result of experimental data. If the weight of the banked rubber 4 is calculated by such an algorithm, the accuracy is ±2.5 kg when the range of measurement is 20 kg to 50 kg, so that the weight of the banked rubber 4 can be extremely accurately measured. The binary coding circuit 12, the area measuring circuit 14, and the weight calculating circuit 15 constitute the processor 11 as a whole and can be made as an integrated unit by known circuit components.

Next, the operation of the preffered embodiment according to the present invention will be described.

Assuming now the front and rear rolls 2 and 3 rotate in the direction shown by the arrows in FIG. 1, the bank rubber 4 is stretched by the front and rear rolls 2 and 3 to generate heat to be thereby softened, and wound on the surface of the front roll 2. The wound rubber 5 is cut by a knife (not illustrated), and removed out in the form of the belt-like fed-out rubber 6 from the heat treatment roll. At the same time the fed-in rubber 7 in an amount corresponding to that of the fed-out rubber 6 is supplied to the banked rubber 4. At this time, the banked rubber 4 is photographed by the video camera 8. However, since the light transmitted from the light source 10 arrives at the video camera 8 as indirect light reflected from the screen 9, without occurring blooming. Alternatively, the light source 10 may be disposed behind the screen 10 and in this case indirect light passing through the screen 9 arrives at the video camera 8. The screen 9 and the portion 13 of the rear roll 3 are placed in the background of the banked rubber 4 in the picture photographed by the video camera 8. In this case the screen 9 is bright since it is irradiated by the light from the light source 10 and the portion 13 of the rear roll 3 is also bright since it is irradiated by the light reflected from the screen 9b. On the other, the bank rubber 4 is dark since only the light reflected from the screen 9 arrives, so that the banked rubber 4 provides a silhouette to rise on the screen 9 and the portion 13 performing a backlight operation, thereby making the contrast stronger. Thus, the outline of the banked rubber 4 is clear.

The picture photographed by the video camera 8 is transmitted to the processor 11 and the present weight can be measured/calculated by the process as described above. Such a result of calculation may be applied, as a feedback signal to, for example, the input device for feeding the fed-in rubber 7 to perform feedback control of the input quantity of the fed-in rubber 7.

In the above-mentioned embodiment, after the banked rubber 4 is divided by n in the direction of the axial direction of the rolls and the area of each division is calculated, used is an algorithm in which the weight is calculated by measuring the sectional area of each division on basis of the result of experiments. However, alternatively, another algorithm in which the weight is directly measured by using, for example, a previously prepared area-to-weight characteristic equation, may be used. Alternatively, the whole area may be simultaneously calculated in the area measuring method of the area. Which of the algorithms is employed chosen in accordance with the property of the heat treatment roll, the required accuracy, and so on. Further, while the screen 9b is made substantially horizontal, it may be in any orientation which brightens the portion 13. Thus it need not always be made horizontal. Although this description has been made as to the preferred embodiment using a heat treatment roll, the present invention may be applied to a calender or other roll.

As described above, according to the present invention, since the boundary of the banked rubber photographed by a camera can be definitized, the amount of the banked rubber can be accurately measured. Further, if feedback control of the amount of the rubber fed to the banked rubber is effected on the basis of the amount of the rubber bank, the amount of the rubber bank can be controlled to a desired value.

We claim:

1. A system for measuring the amount of rubber contained between a pair of rolls comprising;
   camera means arranged in front of a rubber bank constrained between said pair of rolls for obtaining a silhouette of said banked rubber;
   a screen positioned in a straight line connecting said banked rubber and said camera means and located behind said banked rubber;
   a light source directing light onto said screen for illuminating said banked rubber by backlighting, a portion of light from said screen not impinging onto said banked rubber but extending directly into said camera means and providing a bright portion and whereas light from said said screen impinging on said rubber provides a dark portion so that said silhouette is detected by said camera means; and processor means for determining the amount of banked rubber from an image produced by said camera means.

2. The system of claim 1 wherein said camera means comprises a video camera.

3. The system of claim 1 wherein said screen has a horizontal component over one of said rolls and a vertical component disposed behind said one of said rolls to reflect light onto said banked rubber.

4. The system of claim 3 wherein said light source is positioned behind said banked rubber and facing said vertical component.

5. The system of claim 1 wherein said processor means comprises a binary coding circuit receiving a picture signal output from said camera means, an area measurement circuit receiving an output of said binary coding circuit and a weighting circuit receiving the output of said weighting circuit to determine the amount of banked rubber constrained between said rolls.

6. The system of claim 1 wherein said processor means determines the weight W of said banked rubber based on $$\rho \Sigma Rk \times f(Sk/Rk)$$

Where,
$\rho$ = the specific gravity of the banked rubber
$Rk$ = the width of a unit division of said banked rubber in the axial direction of said rolls
$Sk$ = the area of a unit division of said banked rubber in the actual direction.

7. The system of claim 1 further comprising means to feed rubber to said pair of rolls.

8. The system of claim 1 wherein said pair of rolls comprise heat treatment rolls.

9. The system of claim 1 wherein said pair of rolls comprise calender rolls.

10. A system for measuring the amount of rubber contained between a pair of rolls comprising;

camera means arranged in front of a rubber bank constrained between said pair of rolls for obtaining an image of said banked rubber;

a screen positioned in a straight line connecting said banked rubber and said camera means and located behind said banked rubber;

a light source directing light onto said screen for illuminating said banked rubber by backlighting; and processor means for determining the amount of banked rubber from an image produced by said camera means and comprising a binary coding circuit receiving a picture signal output from said camera means, an area measurement circuit receiving an output of said binary coding circuit and a weighting circuit receiving the output of said weighting circuit to determine the amount of banked rubber constrained between said rolls.

11. A system for measuring the amount of rubber contained between a pair of rolls comprising;

camera means arranged in front of a rubber bank constrained between said pair of rolls for obtaining an image of said banked rubber;

a screen positioned in a straight line connecting said banked rubber and said camera means and located behind said banked rubber;

a light source directing light onto said screen for illuminating said banked rubber by backlighting; and processor means for determining the amount of banked rubber from an image produced by said camera means and the weight w of said banked rubber based on $$\rho \Sigma Rk \times f(Sk/Rk)$$

Where,
$\rho$ = the specific gravity of the banked rubber
$Rk$ = the width of a unit division of said banked rubber in the axial direction of said rolls
$Sk$ = the area of a unit division of said banked rubber in the actual direction.

* * * * *